(12) United States Patent
Gu et al.

(10) Patent No.: US 11,164,226 B2
(45) Date of Patent: Nov. 2, 2021

(54) METHOD AND SYSTEM FOR MANAGING PRODUCT ITEMS IN A STORE

(71) Applicant: AiFi Inc., Santa Clara, CA (US)

(72) Inventors: Steve Gu, San Jose, CA (US); Ying Zheng, San Jose, CA (US)

(73) Assignee: AIFI INC., Santa Clara, CA (US)

( * ) Notice: Subject to any disclaimer, the term of this patent is extended or adjusted under 35 U.S.C. 154(b) by 67 days.

(21) Appl. No.: 16/672,369

(22) Filed: Nov. 1, 2019

(65) Prior Publication Data

US 2021/0133835 A1 May 6, 2021

(51) Int. Cl.
*G06Q 30/06* (2012.01)
*G06Q 10/08* (2012.01)
*B65G 1/10* (2006.01)
*B65G 1/02* (2006.01)
*B65G 1/04* (2006.01)
*G06Q 30/02* (2012.01)

(52) U.S. Cl.
CPC .......... *G06Q 30/0601* (2013.01); *B65G 1/02* (2013.01); *B65G 1/04* (2013.01); *B65G 1/0407* (2013.01); *B65G 1/10* (2013.01); *G06Q 10/08* (2013.01); *G06Q 30/02* (2013.01)

(58) Field of Classification Search
CPC .... G06Q 30/0601; G06Q 30/02; G06Q 10/08; B65G 1/10; B65G 1/02; B65G 1/04; B65G 1/0407
USPC ............................. 705/26.8, 26.1, 26.9, 26.5
See application file for complete search history.

(56) References Cited

U.S. PATENT DOCUMENTS

| | | | | |
|---|---|---|---|---|
| 7,792,711 | B2* | 9/2010 | Swafford, Jr. | .......... A47F 1/126 705/28 |
| 10,399,778 | B1* | 9/2019 | Shekhawat | .......... G06Q 10/087 |
| 2012/0029683 | A1* | 2/2012 | Keller | .................... B25J 9/1687 700/214 |
| 2018/0321660 | A1* | 11/2018 | Nemati | ................ G06Q 10/087 |
| 2019/0352092 | A1* | 11/2019 | Zheng | .................... B25J 9/1697 |
| 2020/0316786 | A1* | 10/2020 | Galluzzo | ................ B25J 9/1679 |

FOREIGN PATENT DOCUMENTS

WO  WO-2012018852 A2 * 2/2012 .......... G06Q 10/087

* cited by examiner

*Primary Examiner* — Yogesh C Garg
(74) *Attorney, Agent, or Firm* — Sheppard Mullin Richter & Hampton LLP

(57) ABSTRACT

Methods, systems, and apparatus, including computer programs encoded on computer storage media, for managing product items in a store. One of the methods includes receiving, by a computer system associated with the store, sensor data collected by a plurality of sensors associated with the store, wherein the data is associated with a plurality of product items in the store; determining, by the computer system based on the received sensor data, status information associated with the product items in the store; creating, by the computer system based on the determined status information, a task associated with a group of product items among the product items in the store; sending, by the computer system to a mechanical device, instructions for moving from a current location of the mechanical device to a location of the group of product items and instructions for executing one or more interactions associated with the task with the group of product items; and updating the status information upon completion of the task.

20 Claims, 11 Drawing Sheets

METHOD AND SYSTEM FOR MANAGING PRODUCT ITEMS IN A STORE

TECHNICAL FIELD

The disclosure relates generally to managing product items in a store.

BACKGROUND

Shopping environments may range in size from 100-square-feet mom-and-pop stores to 200,000-square-feet warehouse style grocery stores or outlets. A retail environment may provide for sale a variety of products and serve a variety of customers. Inventory management and customer service provided in the retail environment may often be labor-intensive. For example, employees are often charged with responsibilities such as checking inventory, replenishing products that are sold out, finding and organizing misplaced products, and checking out customers. Particular tasks for managing a retail environment may also be time-consuming for customers. For example, lines may often be formed in front of checkout counters, in which customers may wait for a cashier to scan individual product items and take payment information from other customers. Using employees to perform these tasks may also cause human errors, such as charging for wrong product items. These human errors may result in further delays, inconveniences, and costs.

Conventional inventory management methods may require store attendants to record inventory levels, inspect product items on display and in storage, replenish empty shelf space, reorganize misplaced product items, and make new orders for products. Various inventory-management tasks may be at least partially automized using tools such as inventory keeping software, barcode scanners, mechanical devices (e.g., forklift machines) for moving product items, However, such tools still require substantial human attention and control. Human engagement in inventory management may make a store prone to labor cost and human errors. As a result, there is a need for methods and systems that provide improved automation for inventory management in a store.

SUMMARY

Various embodiments of the present specification may include systems, methods, and non-transitory computer readable media for managing product items in a store.

According to one aspect, the method for managing product items in a store may comprise: receiving, by a computer system associated with the store, sensor data collected by a plurality of sensors associated with the store, wherein the sensor data is associated with a plurality of product items in the store; determining, by the computer system based on the received sensor data, status information associated with the product items in the store; creating, by the computer system based on the determined status information, a task associated with a group of product items among the product items in the store; sending, by the computer system to a mechanical device, instructions for moving from a current location of the mechanical device to a location of the group of product items and instructions for executing one or more mechanical interactions associated with the task with the group of product items; and updating, by the computer system, the status information upon completion of the task.

In some embodiments, the status information associated with the product items may comprise: location information of the product items; and quantity information of the product items.

In some embodiments, the updating the status information upon completion of the task may comprise: receiving, by the computer system from the mechanical device, a signal indicating the completion of the task; and updating, by the computer system, the quantity information of the one or more product items.

In some embodiments, the plurality of product items may be placed in a plurality of containers; and the group of product items may comprise all product items in one of the containers.

In some embodiments, the group of product items may share a same stock keeping unit (SKU).

In some embodiments, the task may comprise removing, from the location of the group of product items, one of the product items of the group that is different from that of one or more other product items of the group.

In some embodiments, the task may further comprise adding one or more product items to the group of product items.

In some embodiments, the sending instructions for moving from a current location of the mechanical device to a location of the group of product items may comprise: determining, for each of a plurality of points in time, a location of the mechanical device at the point in time; determining, based on the location of the mechanical device at the point in time and the location of the group of product items, one or more movements for the mechanical device; and sending, to the mechanical device, instructions for making the one or more movements.

In some embodiments, the determining one or more movements for the mechanical device may comprise: detecting, by the computer system based on the sensor data collected by one or more of the plurality of sensors associated with the store, an obstacle on a path between the location of the mechanical device and the location of the group of product items; and determining the one or more movements to avoid the detected obstacle.

In some embodiments, the one or more mechanical interactions associated with the task may comprise: removing an object from a location; or placing an object to a location.

In some embodiments, the mechanical device may comprise one or more sensors, and the method may further comprise: receiving data collected by the one or more sensors of the mechanical device; and adjusting, based on the data collected by the one or more sensors of the mechanical device, the instructions for moving from the current location of the mechanical device to the location of the group of product items or the instructions for executing the one or more mechanical interactions associated with the task.

In some embodiments, the mechanical device may comprise: a first component configured to move the mechanical device from the current location of the mechanical device to the location of the group of product items; and a second component configured to execute the one or more mechanical interactions associated with the task, wherein the second component is detachable from the first component and is configured to send one or more signals to the first component.

In some embodiments, the method may further comprise: ordering, based on the updated status information, a plurality of product items from a supplier.

According to another aspect, a system for managing product items in a store may comprise a plurality of sensors and a computer system, the computer system comprising a processor and a non-transitory computer-readable storage medium storing instructions executable by the processor to cause the system to perform operations comprising receiving sensor data collected by a plurality of sensors associated with the store, wherein the sensor data is associated with a plurality of product items in the store; determining based on the received sensor data, status information associated with the product items in the store; creating based on the determined status information, a task associated with a group of product items among the product items in the store; sending to a mechanical device, instructions for moving from a current location of the mechanical device to a location of the group of product items and instructions for executing one or more mechanical interactions associated with the task with the group of product items; and updating the status information upon completion of the task.

According to yet another aspect, a non-transitory computer-readable storage medium for managing product items in a store may be configured with instructions executable by one or more processors to cause the one or more processors to perform operations comprising receiving sensor data collected by a plurality of sensors associated with the store, wherein the sensor data is associated with a plurality of product items in the store; determining, based on the received sensor data, status information associated with the product items in the store; creating based on the determined status information, a task associated with a group of product items among the product items in the store; sending to a mechanical device, instructions for moving from a current location of the mechanical device to a location of the group of product items and instructions for executing one or more mechanical interactions associated with the task with the group of product items; and updating the status information upon completion of the task.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Figure 1:
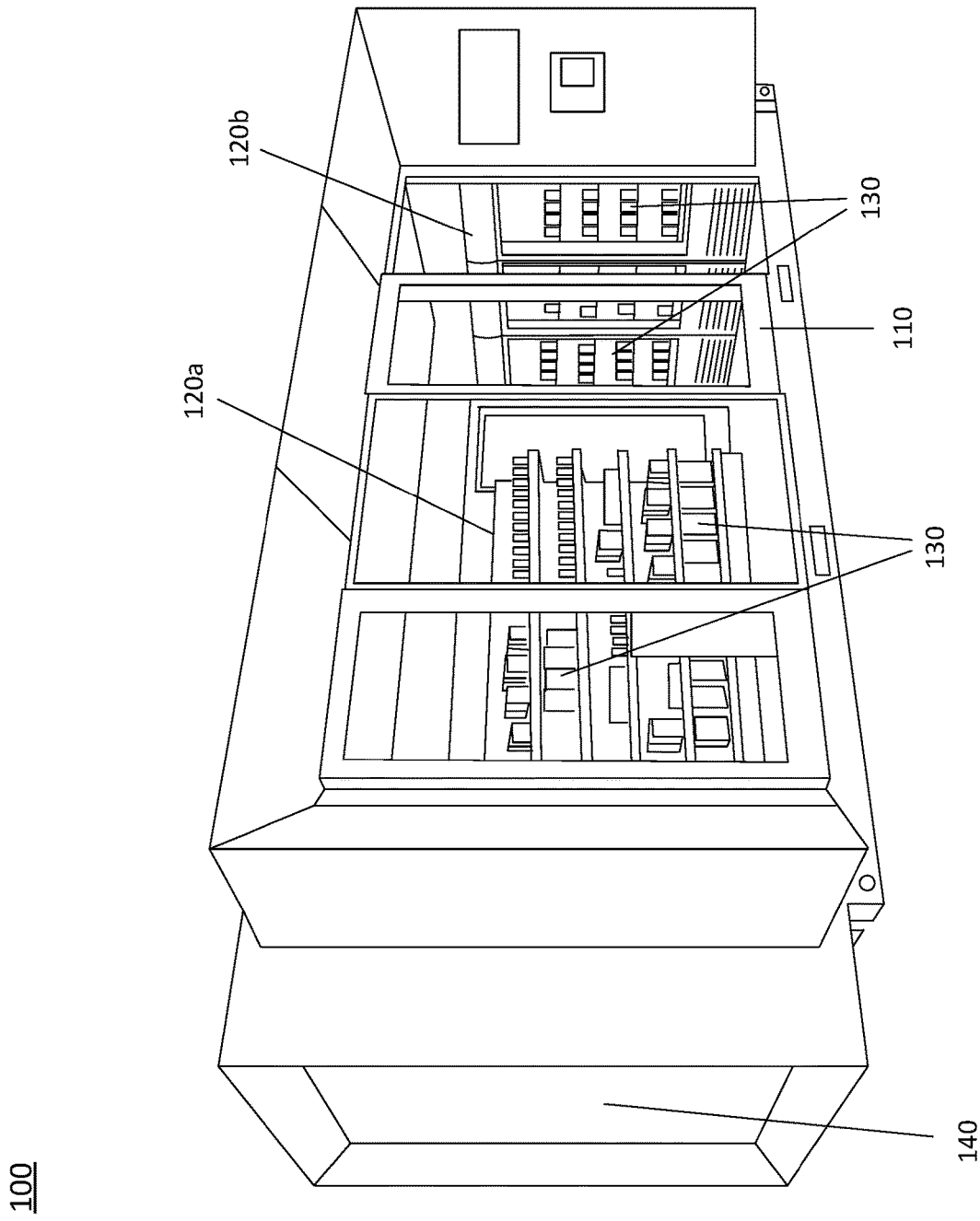
FIG. 1 illustrates an example setup of an autonomous store.

Specific, non-limiting embodiments of the present invention will now be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

In some embodiments, a store may provide autonomous services to customers. Such an autonomous store may comprise a plurality of sensors that collect data from the environment, and particularly about product items, persons, and other objects, both immobile and movable, in the store. A computer system in the autonomous store may process the data collected by the sensors to recognize and track product items and objects, to identify and track persons, and to determine interactions between the persons and the product items and/or objects. Based on the sensor data, the computer system may extract appearance features, determine the identities of the product items, and thus keep track the status information of the product items (e.g., location information, inventory levels). In this way, the computer system may promptly detect outlying product items (e.g., a misplaced product item, a rotten or moldy fruit, an expired product) based on the extracted appearance features and the identities. In addition, the computer system may also be able to retrieve the corresponding product information including price, weight, expiration date, suppliers, as well as inventory information such as quantities. In this manner, the computer system may detect the shortages of certain product items on display for sale (e.g., on shelves) and low inventory levels.

In some embodiments, after detecting issues such as outlying product items, shortages of product items on display, or low inventory levels, the computer system of the autonomous store may determine appropriate tasks to resolve the issues. In some embodiments, certain tasks may be handled by the computer system with the help of mechanical devices, such as a robot with mobility and a capacity of interacting with objects (e.g., removing and placing objects), a smart shelf with mechanical rails or arms, another suitable device, or any combination thereof. In some embodiments, the mechanical devices may receive instructions (including instructions for both navigation and interactions with objects) from the computer system who has analyzed the sensor data and determined the appropriate tasks. In this way, the mechanical devices may need less sensory and computing capacities, thus be more affordable and practical. In some embodiments, the mechanical devices may be equipped with one or more sensors (e.g., image sensors, proximity sensors, liquid detection sensors, motion sensors, laser sensors) and the sensor data collected may be sent to the computer system for aggregation. For example, the image sensors installed on the ceiling and walls may not be able to capture the data of certain product items when their direct lines of sight are blocked by obstacles (e.g., moving customers, shopping carts, a pile of product items to be restocked). The mechanical device may be able to get around the obstacles and collect the data missed by the computer system. As another example, the data collected by the sensors installed on the ceiling and shelves may be relatively inaccurate due to the distance and other interference factors (e.g., reflection of lights, the background color, a moving object causing vibration). As a result, the computer system's determinations based on these data may be false positives or false negatives. In contrast, the sensor data collected by the mechanical device in close proximity to the product items at issue may be more detailed and accurate. The computer system may aggregate the data collected by the mechanical device's sensors to adjust its machine learning models or determinations.

Different product items may have different shapes, textures, weights, surface materials, which may make the interactions between the mechanical device and the product items excessively challenging. Handling the product items using containers may avoid the complexities of handling each single product item for the mechanical device. In some embodiments, the autonomous store may use shelves and containers to display the product items for sale. For example, product items sharing the same stock keeping units (SKU) numbers may be placed in the same container for easy management. In some embodiments, if a product item in a container needs to be managed, the entire container may be removed and replaced with a prepared container. For example, a container with misplaced product items may be removed and replaced with a prepared new container containing organized product items. Similarly, a container with low quantity of product items on display may be replaced with a new container filled with the product items of the same type.

FIG. 1 illustrates an example setup of an autonomous store 100. The autonomous store 100 may comprise a system for tracking a product item in the store 100. In some embodiments, the autonomous store 100 may provide an enclosed environment. The store 100 may comprise one or more doors 110, and one or more shelves, such as 120a and 120b. The doors 110 may be hinged doors, revolving doors, sliding doors, or other suitable doors. In some embodiments, the store 100 may comprise two sets of doors 110 with a small space in between to prevent multiple people entering the store at once, which may complicate tracking of the people. In some embodiments, the shelves 120 may hold product items 130 for selection and purchase by a customer. In some embodiments, the autonomous store 100 may comprise one or more outer surfaces 140 that may be used for a plurality of potential purposes (e.g., displaying advertisements).

Figure 2:
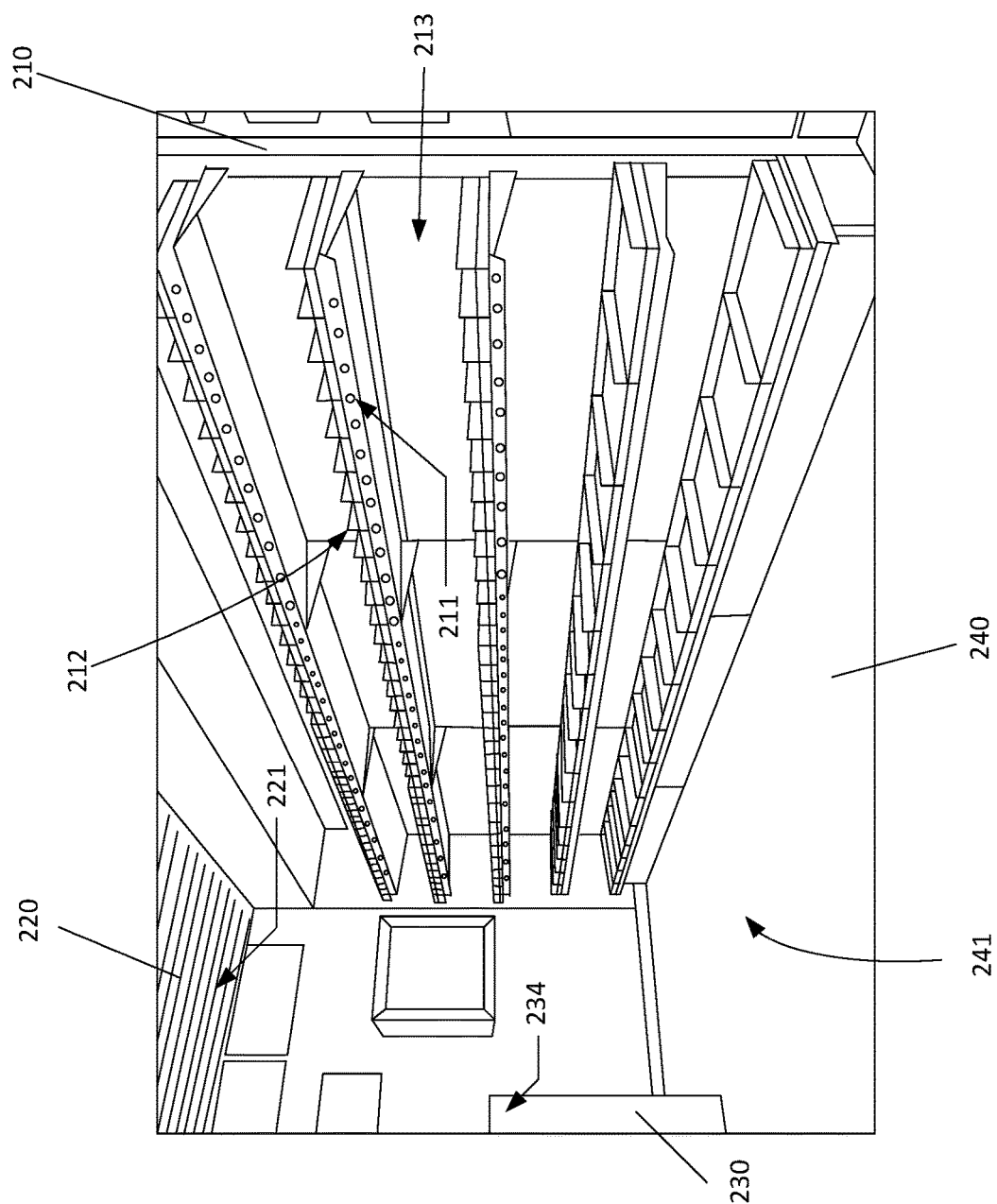
FIG. 2 illustrates example locations to place sensors in an autonomous store.

FIG. 2 illustrates example locations to place sensors in an autonomous store. In some embodiments, one or more sensors may be affixed to one or more structures in the autonomous store. The structures may comprise, for example, a ceiling, a floor, a shelf, a rack, a refrigerator, other suitable structures, or any combination thereof. Illustrated by FIG. 2 may be an inner space of an autonomous store. The autonomous store may comprise one or more shelves 210, a ceiling 220, one or more fixtures 230 (e.g., a peg), a floor 240. In order to collect data about product items and persons in the automated checkout store, a plurality of sensors may be placed in various locations in the indoor environment. For example, one or more sensors 211 may be affixed to the bottom of each shelf 210, one or more sensors 212 may be affixed above each shelf 210, and one or more sensors 213 may be affixed on a backboard supporting the shelves 210. As another example, one or more sensors 221 may be affixed to the ceiling 220, one or more sensors 231 may be affixed to fixtures 230, and one or more sensors 241 may be affixed to the floor 240.

In some embodiments, the sensors (e.g., the one or more sensors 211, 212, 213, 221, 231, and/or 241) placed in the autonomous store 100 may comprise one or more image sensors (e.g., RGB cameras, IR cameras, depth cameras), one or more weight sensors, one or more force sensors, one or more pressure sensors, one or more vibration sensors, one or more proximity sensors, one or more resistance-based film sensors, one or more capacitive sensors, other suitable sensors, or any combination thereof. The sensors may be used to collect signals associated with one or more product items and one or more persons. In some embodiments, the sensors may be powered through one or more network cables using power over ethernet ("POE"). The sensors may also be powered using one or more other suitable methods or devices.

As an example and not by way of limitation, one or more weight sensors affixed to a shelf (e.g., one of shelves 210) may measure weights of one or more product items; one or more weight sensors affixed to a floor (e.g., floor 240) may measure weights of one or more persons present in the autonomous store 100; one or more pressure sensors affixed to the shelf 210 may measure the shape of bottom surfaces of the product items and determine their respective positions. One or more image sensors may determine the colors and other appearance characteristics of the product items.

As another example and not by way of limitation, vibration sensors placed on corners of a shelf 210 may be used to detect vibration corresponding to an event associated with product items placed on the shelf 210 (e.g., a customer picking up a product item). One or more proximity sensors (e.g., comprising one or more infrared transceivers) placed on a surface of the shelf 210 may detect a proximity of a hand of a customer to one or more product items, which may be used to determine a movement of the hand (e.g., hovering over a product item). The data gathered by the vibration sensors and the proximity sensors may be complemented by data from one or more image sensors which may comprise one or more images of the customer and the one or more product items. Based on the data collected by these sensors, a computer system associated with the autonomous store may determine one or more movements of the hand of a customer with respect to one or more product items and may thereby determine customer activities such as picking up a product item or placing a product item on a shelf 210.

As yet another example and not by way of limitation, a plurality of image sensors may be used to gather image data of a person moving in the autonomous store 100. One or more computing devices or components thereof (e.g., a graphics processing unit (GPU), a central processing unit (CPU), a system on a chip (SoC)) may be used to process digital images and videos captured by the image sensors. Each image sensor or group of image sensors may collect data from a particular area of the autonomous store 100. Data from each of the one or more image sensors may be processed to determine a probability that a particular person is at a particular location. The processing results may be aggregated to determine a location of the person and to construct a model reflecting a movement path of the person during a particular period of time. The data gathered by the image sensors may be supplemented by data gathered by one or more weight sensors placed below the surface of the floor near the door 110 of the autonomous store 100. Changes to data from the weight sensors may indicate that a person walks in or out of the store 100.

In some embodiments, one or more image sensors in the autonomous store may be automatically calibrated. One or more projectors may be installed in the store. The projectors may project patterns on, for example, the floor or ceiling of the store. One or more parameters of the image sensors (e.g., position, angle, distortion factor) may be calibrated based on a portion of the pattern captured by the image sensors. Similarly, one or more patterns may be printed on one or more fixtures within the store (e.g., shelves 210). The image sensors may capture images of such patterns and automatically calibrate their parameters. In some embodiments, the projectors may also be used to project one or more images that may improve user experience. For example, price or other information about one or more products may be projected on the products.

The one or more sensors may have overlapping fields of view. Data from the one or more sensors may be fed into the computer system to be synthesized and/or integrated to acquire information of an entire autonomous store. In some embodiments, each of the image sensors may be calibrated using people as calibration markers. As an example, the computer system may identify body key points of persons as captured by the image sensors and match the identified body key points between the sensors. In some embodiments, the computer system may extract detections from each of the sensors, synchronize frames using time-stamp, and cluster one or more persons using re-id features. The computer system may aggregate key points from one or more persons over a time period for each camera. The computer system may match key points of a same time and a same person on pairs of sensors to calibrate the one or more sensors. In some embodiments, the computer system may detect an object moving along a route and feature points on the object. The computer system may capture a first set of one or more images of the feature points of the object along the route by a first sensor and a second set of one or more images of the feature points of the object along the route by a second sensor. The computer system may calibrate the first sensor and the second sensor by matching the features points of the object along the route by the first sensor and the feature points of the object along the route by the second sensor at a same time stamp. In some embodiments, the computer system may calibrate one or more image sensors based on visual patterns or fixtures in an indoor environment. The computer system may process images of the visual patterns or fixtures and compare them with known locations and shapes of the visual patterns or fixtures to determine the locations and directions of the image sensors that captured the images. More information about calibration of image sensors is described in U.S. patent application Ser. No. 16/197,369, filed Nov. 21, 2018, which is incorporated herein by reference.

Figure 3:
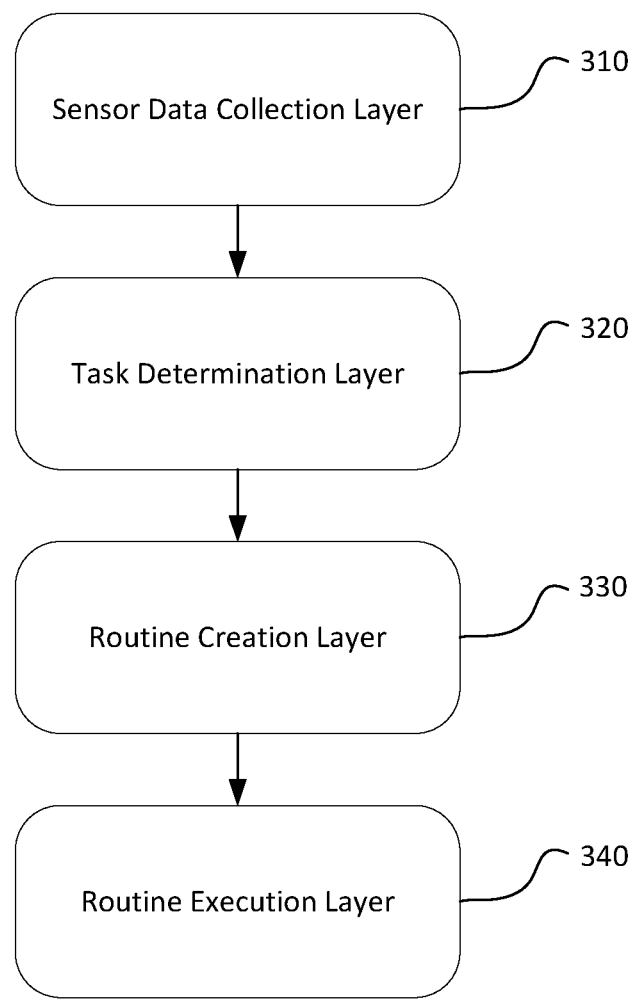
FIG. 3 illustrates an example system for automatically managing product items in a store.

FIG. 3 illustrates an example system for automatically managing product items in a store. In some embodiments, the system may comprise one or more of layers including sensor data collection layer 310, task determination layer 320, routine creation layer 330, and routine execution layer 340. In some embodiments, the layers may have overlapping functionalities and may be merged or split as necessary. In some embodiments, more layers may be necessary depending on the use cases. In some embodiments, the system 300 may comprise a computer system and one or more mechanical devices. Each layer of the system 300 may be implemented on the computer system, one or more of the mechanical devices, or the computer system operating in conjunction with one or more of the mechanical devices.

In some embodiments, the sensor data collection layer 310 of the system 300 may collect sensor data from various sensing sources. These sources may include signals from an array of cameras, touch capacitive sensors, weight sensors, force sensors, and/or vibration sensors mounted in various parts of the autonomous store such as the ceiling, cashier level, shelf level. In some embodiments, the inputs may also include the sensor data collected by movable mechanical devices equipped with sensors. Examples of such devices may include robots roaming around the store, smart shelves with mobile arms or rails, drones with image sensors, other suitable types of devices, or any combination thereof. The computer system associated with the system 300 may aggregate these input signals to identify a product item and monitor the status information of such product item, including the location information, the quantity of such product item on display for sale, and the corresponding inventory level. In some embodiments, the computer system may mine the collected data to discover various trends that may help the store to make wise inventory management strategies and investment decisions such as promptly replenishing the inventories for popular product items to meet the current and near-term demands.

In some embodiments, the task determination layer 320 of the system 300 may perform decision-making operations based on the data collected from the various sensing sources. In some embodiments, the computer system may extract features from the collected sensor data of product items including appearance features, locations, other suitable features, or any combination thereof. The computer system may then aggregate the extracted features of the product items and input the features into a machine learning model to detect potential issues and determine the necessary reactions. For example, the computer system may use a decision tree to detect misplaced product items. Each node of the decision tree may denote a degree of discrepancies of an appearance feature (e.g., color, shape, mass, volume, another suitable feature, or any weighted combination thereof) between the product item at issue and its neighboring product items. Each branch of the decision tree may denote the outcome of a determination regarding the above appearance discrepancies. For example, a product item of scarlet color may be determined as an outlier among the neighboring items of marron color with a low confidence score, while a product item of white color may be determined an outlier among the neighboring items of dark brown with a high confidence store. Each leaf node of the decision tree may hold a decision whether the product item is an outlier (e.g., a misplaced item, or an item that needs to be rearranged) among its neighboring product items and the corresponding confidence score. In some embodiments, the computer system may determine a plurality of identities of a group of product items and, based on the identities, determine whether one product item is an outlier requiring removal, rearrange, or replacement. In some embodiments, the store may use containers to house the product items for display on the shelves, with each container housing the same type of product items. Each of the containers may bear a specific pattern (e.g., a QR code, bar code) indicating the particular type of product items it is housing. Once the identities of the product items within a container are determined, the computer system may compare the identities with the observed pattern on the container and determine if some of the items are outliers requiring removal, rearrange, or replacement.

In some embodiments, the computer system of the autonomous store may determine product item shortages or overstocking based on the collected sensor data. For example, the computer system may determine the identities of a plurality of product items on display for sale, and subsequently detect that the quantity of a certain product item on the shelf is lower than a predetermined threshold. In this manner, the computer system may determine a shortage of the product item on the shelves. As another example, the computer system may maintain a database populated with information of the product items for sale during inventory management. The information may comprise store keeping units (SKU) numbers of the product items as the indexes that are mapped to the prices, product options (e.g., size, color), suppliers, inventory levels, other suitable information, or any combination thereof. Therefore, once the determined identities of the product items are linked to the corresponding SKU numbers, the computer system may retrieve the information associated with the product items. Based on the historical inventory level data, the computer system may determine that certain product items are overstocked and may require appropriate actions (e.g., returning to the manufacturer or original distributor; liquidating to companies that then resell it on the secondary wholesale or retail market; selling at an extreme discount to existing customers; or selling to salvage companies). In some embodiments, the identities of the product items determined based on the sensor data may also be used to determine if replenishments of certain product items from corresponding suppliers are necessary in order to meet the demands.

In some embodiments, the routine creation layer 330 of the system 300 may create a routine (e.g., a series of instructions) to accomplish the task determined by the task determination layer 320. The routine may be executed by a mechanical device with or without human intervention. In some embodiments, the mechanical device may be capable of performing a finite number of motions. The execution of the routine may cause the mechanical device to execute various combinations of the motions. For example, a mechanical device capable of moving, gripping an object from a location, and placing an object to a location may allow the computer system to generate instructions to remove a misplaced item from the shelf. In some embodiments, the routine may comprise one or more phases comprising relocation phase and interaction phase. The relocation phase may refer to the device being relocated from its current location to the target location (e.g., the location of the product item of interest on the shelf or in a storage room). The interaction phase may refer to the device interacting with the product item with a plurality of actions. In some embodiments, the one or more phases may be repetitive and interleaved with each other. For example, the mechanical device may need to first relocate to the inventory room (e.g., relocation phase 1) to pick up certain product items (e.g., interaction phase 1) and then move to the shelf of interest (e.g., relocation phase 2) to place the product items therein (e.g., interaction phase 2).

In some embodiments, the relocation phase (e.g., relocating the device from a current location to a target location) may optionally start with determining the current location of the mechanical device. The determination may be based on the data collected by the sensing system installed in the store that locate the device, or location data received from the device. In some embodiments, the current location of the device may not be necessary to route the device to the target location. For example, a device with self-navigation capability may be able to determine a route by itself based on the target location. In some embodiments, a device may depend on the routing instructions received from the computer system in order to relocate to the target location. The routing instructions may be determined by the computer system based on the real-time data collected by the sensors installed on the store's fixtures. For example, the routing instructions may comprise "forward X steps, turn left, forward Y steps, turn left, forward Z steps, stop, and turn right." As another example, the computer system may determine the routing using its pre-stored floor map based on the current and target locations of the mechanical device. In some embodiments, a device may be equipped with sensors, and the routing solution may be determined by the computer system aggregating the sensing data collected by both the sensors installed on the store's fixtures and the sensors on the device. For example, the data collected by the sensors installed on the ceiling may be used to determine a general (e.g., rough) route while the data collected by the sensors on the device may be used to fill in the routing details, such as avoiding obstacles (e.g., a moving customer, a shopping cart, a pile of product items to be restocked) or a slippery spot (e.g., spilled water, a banana peel) on the floor, another suitable scenario, or any combination thereof.

In some embodiments, the interaction phase of a routine may involve a mechanical device, the computer system, or a combination thereof, to execute a list of instructions to accomplish the corresponding task. For example, the instructions for the mechanical device to remove a misplaced item may comprise: gripping the misplaced item, placing the misplaced item into a storage unit associated with the mechanical device, and moving the mechanical device to a designated location (e.g., a room, a storage room, a machine sorting and organizing product items). As another example, the instructions for restocking product items of certain type on the shelves may comprise two groups of actions. The first group of actions may be carried out by the mechanical device in the warehouse (e.g., or a storage room keeping the product items). The actions may comprise gripping the product items from the inventory, placing the product items into the storage unit associated with the mechanical device. The second group of actions may be executed by the mechanical device at the target shelf. The actions may comprise gripping the product items from the storage unit associated with the mechanical device and placing the product items on the target shelf. In some embodiments, the routines may vary depending on the specific configurations and organizations of product items in the store. For example, a store using uniform containers holding the product items on shelves may need much simpler routines than a store handling the product items of different shapes, weights, textures, individually.

In some embodiments, the routine execution layer 340 of the system 300 may perform the routine created by the routine creation layer 330. In some embodiments, the routine may be executed by a mechanical device, a computer system of the store, or a combination thereof. For example, the execution of the routine to remove a product item from a shelf may involve the computer system guiding the mechanical device to the target location, followed by the mechanical device physically removing the target item. As another example, the execution of the routine to replenish product items may involve using the computer system to make one or more orders from corresponding suppliers.

Figure 4A:
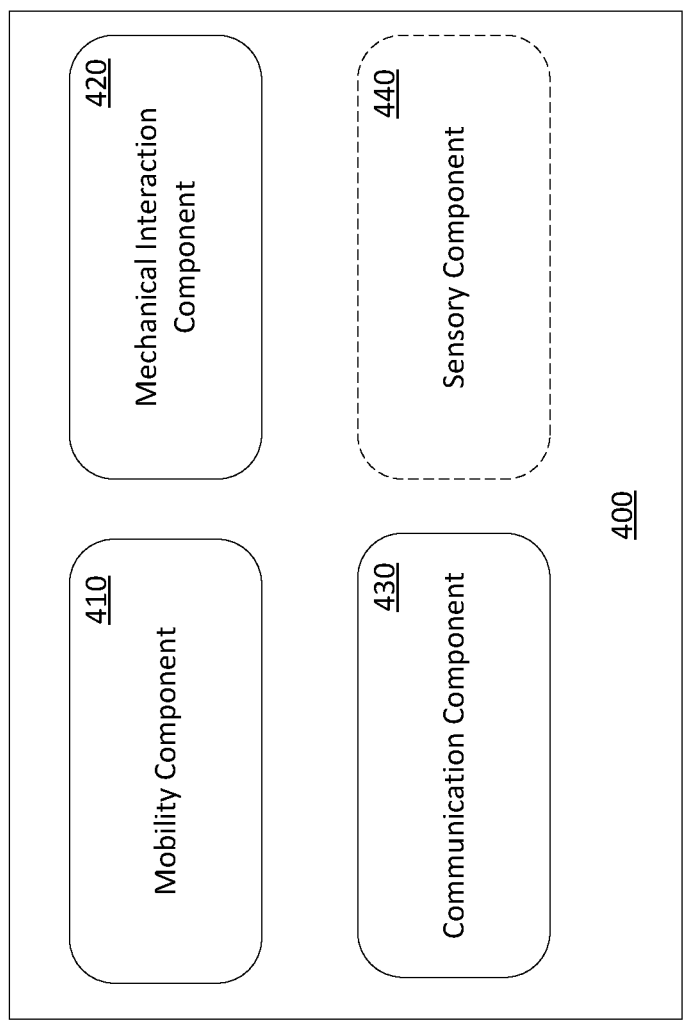
FIG. 4A illustrates example components of a mechanical device for managing product items in an autonomous store.

FIG. 4A illustrates example components of a mechanical device for managing product items in an autonomous store. In some embodiments, the mechanical device 400 may comprise a plurality of components comprising a mobility component 410, a mechanical interaction component 420, a communication component 430, and an optional sensory component 440. In some embodiments, the mechanical device 400 may comprise additional or alternative components. For example, an energy management component (e.g., electric circuit, an array of batteries storing energy) may be integrated with the mechanical device 400.

In some embodiments, the mobility component 410 may empower the mechanical device to move from one location to another location. For example, the mechanical device 400 may be a movable mechanical arm, a smart shelf with rails (to be shown in FIG. 4B), a robot with wheels and arms (to be shown in FIG. 4C), another suitable mobility device, or any combination thereof.

In some embodiments, the mechanical interaction component 420 may provide the mechanical device capabilities to perform a plurality of mechanical motions. For example, the device 400 may be equipped with mechanical arms (e.g., linkages) or hands controlled by actuators that can move towards an object, grip the object, move towards another location with the object, and release the object at a target location (e.g., a tray). In some embodiments, the mechanical interaction component 420 may comprise one or more detachable units that are separable from the main body of the mechanical device 400. In some embodiments, each of the detachable units may be initially carried by the main body of the device (including the mobility component) to the target location (e.g., a section on a shelf), and then detached from the main body of the device to perform the assigned task. In some embodiments, each of the detachable units may have its own mobility component and be able to navigate to the target location by itself to execute the assigned task.

In some embodiments, each of the detachable units may signal the main body of the mechanical device 400 upon the completion of the assigned task. The main body of the mechanical device 400 may then recollect the detached units that have finished the assigned tasks. In some embodiments, the mechanical device 400 may keep accepting new tasks from the computer system and maintain them in a queue. If a detachable unit becomes available, the mechanical device 400 may pop out the task from the top of the queue and assign it to the available detachable unit to execute. In some embodiments, the mechanical device 400 may maintain more than one queues for tasks of different priorities. For example, refilling product items to an empty shelf might be more urgent than removing a misplace item and may be handled with a higher priority. With the detachable units, the mechanical device 400 may execute a plurality of tasks in parallel by distributing the tasks to the available detachable units.

In some embodiments, the communication component 430 may allow the mechanical device 400 to exchange messages or signals with the computer system of the store. For example, the computer system may send control messages (e.g., routing instructions, instructions to perform actions) to the mechanical device 400 to act. After the act is finished, the mechanical device 400 may respond to the computer system with a task completion signal, and the computer system may update the inventory logistics accordingly. As another example, the mechanical device 400 may periodically or continuously report its current location to the computer system.

In some embodiments, the mechanical device 400 may be optionally equipped with a sensory component 440. The sensory component 440 may include various sensors and be able to capture sensor data of objects and the environment in proximity. The computer system may receive (or actively request) such sensor data from the mechanical device 400 and aggregate it with the data collected by other sensors in the store to make informed decisions regarding routings or interactions. For example, the direct lines of sight of the sensors installed on the ceiling, floor, shelves may be temporarily blocked by objects such as customers, shopping carts, or dropped product items. The computer system may detect the cutoffs of the sensing data streams and navigate the mechanical device 400 to the questionable area to feed accurate observations to the computer system.

In some embodiments, the computer system may sometimes make false positive decisions such as wrongfully determining a product item as an outlier from the neighboring product items. For example, if the computer system uses a machine learning model to identify objects based on features including color, there may be a possibility that a ripe apple in merlot color being determined as different from its peer apples in light red color. After being sent to remove the product item, the mechanical device 400 may discover that the apple in merlot color is in fact the same product item as its neighboring items. The mechanical device 400 may send captured image data back to the computer system. Based on the feedback, the computer system may adjust the parameters (e.g., weights and bias) of its machine learning model accordingly to lower the chance of such misidentification or misclassification in the future.

In some embodiments, the computer system may determine a route to move (e.g., relocate) the mechanical device 400 from its current location to the target location. Nevertheless, the mechanical device 400 may subsequently adjust the routing based on its real-time observation of the environment. For example, the sensors installed on the ceiling and shelves may not be able to observe water spilled on the floor, which may be missed by the computer system when determining the routing for the mechanical device. However, the mechanical device 400 may detect such situation using its liquid detection sensors and accordingly adjust the received routing by avoiding the slippery spot. In some embodiments, the mechanical device 400 may send the observations of dropped objects (e.g., liquid, product items, banana peels) to the computer system to notify store employees or another specialized mechanical device (e.g., a robot janitor) to clean them up. In some embodiments, the mechanical device 400 may be loaded with equipment to perform the clean-up on site.

Figure 4B:
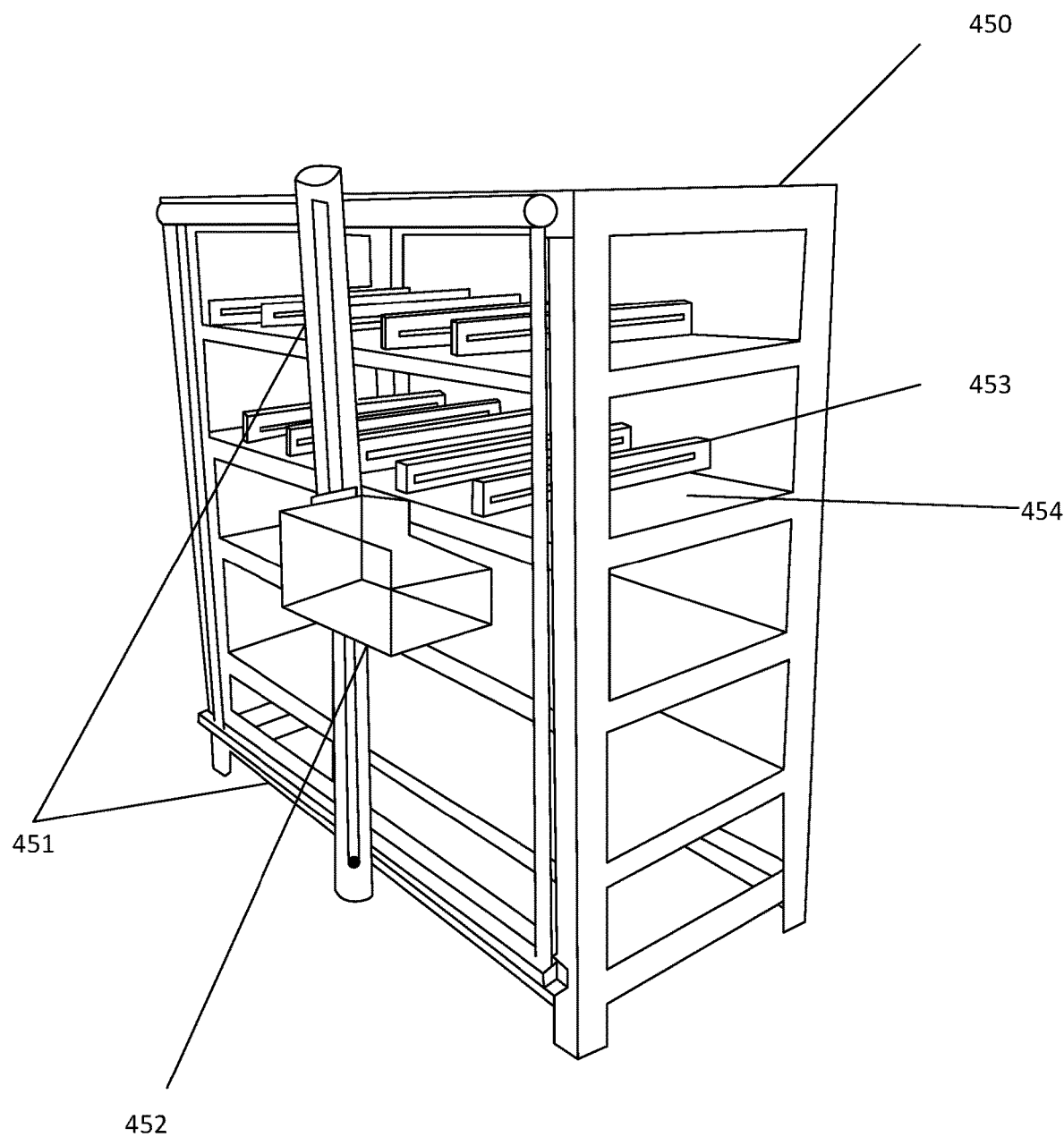
FIG. 4B illustrates an example mechanical device for managing product items in an autonomous store.

FIG. 4B illustrates an example mechanical device for managing product items in an autonomous store. As shown, the mechanical device in FIG. 4B may be a shelving unit 450 equipped with various mechanical components comprising a mobility component and a mechanical interaction component. In some embodiments, the mobility component may be a rail system 451 comprising a horizontal rail and a vertical rail shown in FIG. 4B. In some embodiments, the mechanical interaction component may comprise a storage unit 452 and an object conveyor 453. The storage unit 452 may be used for storing an object removed from a shelf of the shelving unit 450 or an object to be placed onto the shelf. The object conveyor 453 may be used to physically move an object from the shelf into the storage unit 452 or from the storage unit 452 onto the shelf. In some embodiments, a shelf of the shelving unit 450 may be divided into multiple areas 454. Each of the areas 454 may host a container to hold product items. In some embodiments, the rail system 451 may relocate the storage unit 452 to a target location, e.g., one of the areas 454 with a container holding a misplaced product item. In some embodiments, the rail system 452 may deliver the objects placed in the storage unit 452 to a designated area in the store for further processing. In some embodiments, the object placed in the storage unit 452 may be transferred to a carrier (e.g., a mobile cart, a robotic device with wheels and a tray), which may subsequently deliver the object to the designated area.

In some embodiments, the shelving unit 450 may also comprise a communication component to exchange messages with a computer system. The computer system may send a control signal comprising a target location (e.g., level X area Y) to the shelving unit 450 to retrieve a specific container or a request for the sensor data of items in the specific container. In some embodiments, the shelving unit 450 may respond to the request for sensor data using a plurality of sensors installed on the shelves. For example, a plurality of image sensors may be placed to collect the visual data of the product items in the containers on the shelves, a plurality of weight sensors may be placed under the containers to detect an item removed, a plurality of proximity sensors or motion sensors may be used to detect a customer's motions such as removing, placing a product item. In some embodiments, the storage unit 452 associated with the shelving unit 450 may also carry one or more sensors. Because of the mobility of the storage unit 452 (being coupled with the rail system 451), it may be used to capture sensor data from any area of interest on the shelving unit 450 in proximity. In some embodiments, the storage unit 452 may be detached from the rail system. For example, after a container is placed in the storage unit 452, the rail system 452 may transfer the storage unit 452 to a mobile carrier to deliver it to a designated area. The shelving unit 450 may pick up a replacement storage unit 450, e.g., from the mobile carrier, for next use.

Figure 4C:
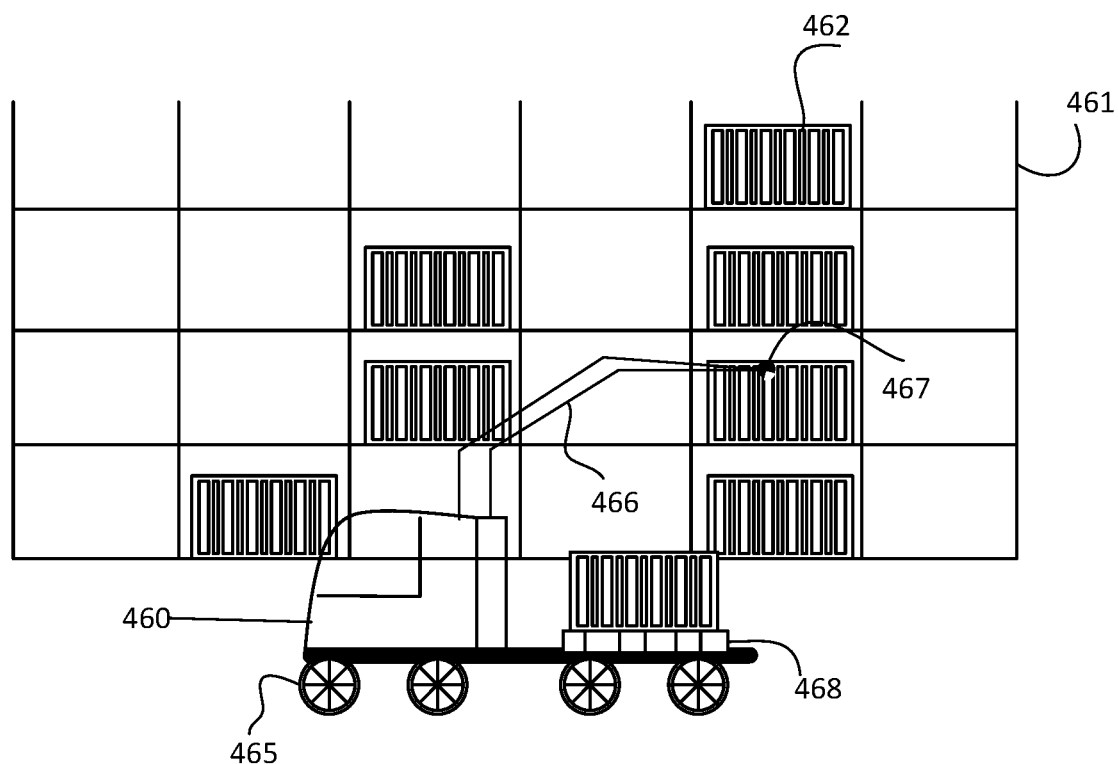
FIG. 4C illustrates another example mechanical device for managing product items in an autonomous store.

FIG. 4C illustrates another example mechanical device for managing product items in an autonomous store. As shown, the mechanical device in FIG. 4C may be robotic cart 460 equipped with various mechanical components comprising a mobility component and a mechanical interaction component. In some embodiments, the mobility component may comprise wheels 465 and necessary parts such as actuators. In some embodiments, the mechanical interaction component may comprise a mechanical arm 466, a mechanical hand 467, and a storage unit 468 associated with the cart 460. The mechanical arm 466 may be configured to move the mechanical hand 467 to a target location on a shelving unit 461. The mechanical hand 467 may be instructed to pick up an object 462 from a shelf of the shelving unit 461, and coordinate with the mechanical arm 466 to place the object in the storage unit 468 on the cart 460. In some embodiments, the mechanical hand 467 may be able to perform a number of basic motions such as gripping an object and releasing an object. These basic motions may be used to build a sequence of motions to accomplish a meaningful task. The cart 460 may then deliver the object to a designated area for further processing. In some embodiments, the shelving unit 461 may be divided into a plurality of spaces, with each space housing a container 462 holding product items. In this case, the mechanical hand 467 may deal with containers rather than individual product items.

In some embodiments, the robotic cart 460 may be equipped with a communication component exchanging messages with a computer system. For example, the computer system may determine a route for the cart to relocate to a target location based on the image data collected from the sensors in the store. The routing may comprise a plurality of moves guiding the cart towards the target location.

In some embodiments, the cart 460 may also have sensors installed thereon. For example, it may have sensors installed around its main body or mobility component for navigation purpose. As another example, it may have sensors on the mechanical arm 466 or the mechanical hand 467 to capture sensor data of objects on the shelves in close proximity.

In some embodiments, the cart 460 may carry a plurality of detachable mechanical hands 467 that each may be programmed to carry out a task. The cart 460 may leave more than one mechanical hands at multiple target locations to execute multiple tasks in parallel. Once a task is finished, the corresponding mechanical hand 467 may notify the main body of the cart 460 (e.g., for pick up, or for being available for another task). In some embodiments, the cart 460 may maintain one or more task queues to manage the tasks with priorities and dispatch the tasks to the available mechanical hands 467.

Figure 4D:
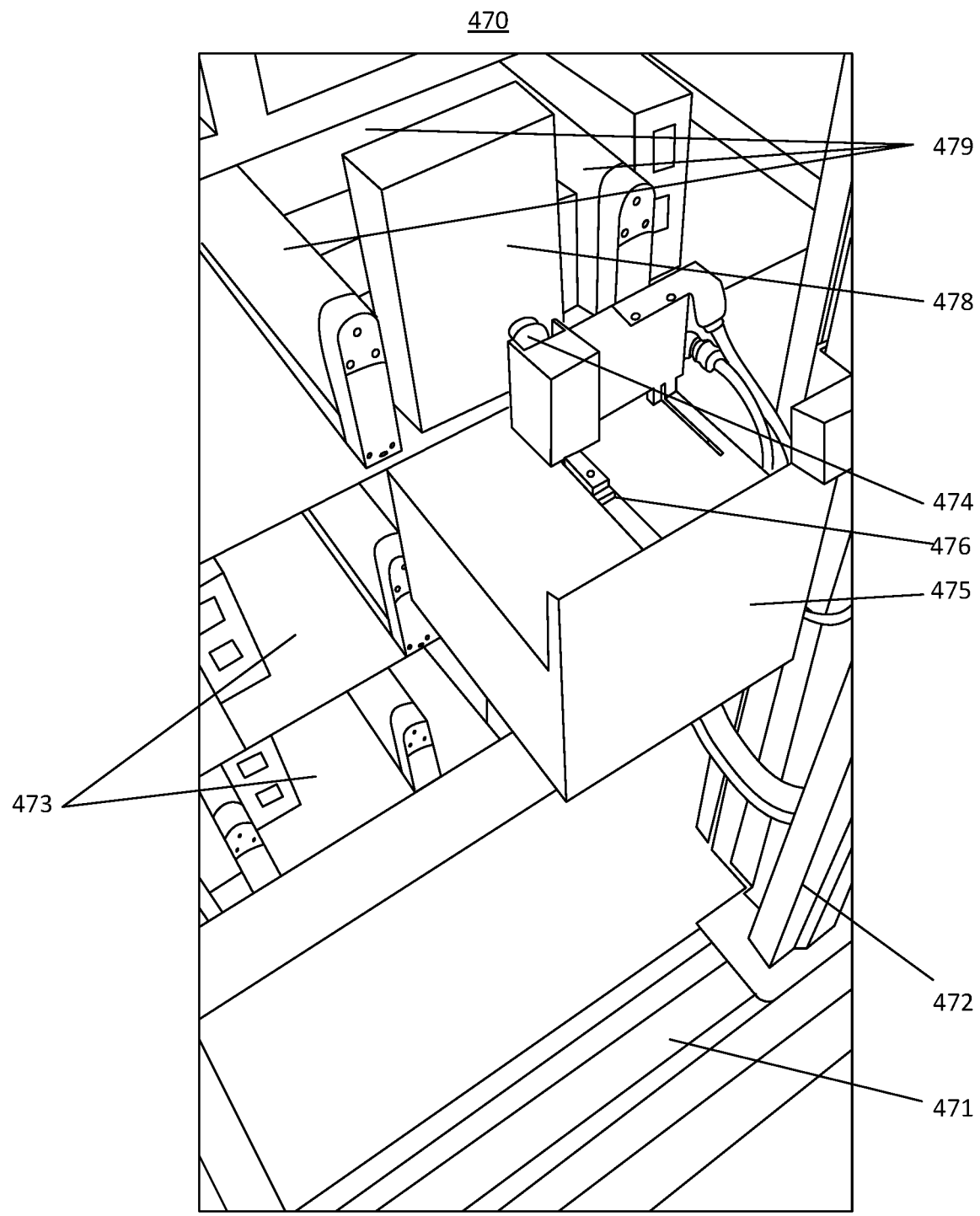
FIG. 4D illustrates yet another example mechanical device for managing product items in an autonomous store.

FIG. 4D illustrates yet another example mechanical device for managing product items in an autonomous store. As shown, the mechanical device in FIG. 4D may be a shelving unit 470 equipped with various mechanical components comprising a mobility component, a mechanical interaction component, and an item transportation component. In some embodiments, the mobility component may be a rail system similar to the rail system 451 in FIG. 4B and comprises a horizontal rail 471 and a vertical rail 472. If the shelving unit is divided into a plurality of columns 473 (e.g., an entire array of product items), the horizontal rail 471 and the vertical rail 472 of the mobility component may work collectively to move the mechanical interaction component to a target column. In some embodiments, the mechanical interaction component may comprise a suction device 474 (e.g., a suction cup) that can apply suction force to the surface of a product item 478 and an optional weight bearing holder 475. The suction device 474, after being moved to the target column, may move its nose or head in touch with or in proximity to the surface of the first item 478 of the target column, and apply suction power (e.g., by pressing out the air) to pick the item 478 up. The optional weight bearing holder 475 may provide support to the suction device 474 by allowing the suction device 474 to temporarily place the picked-up item 478 on the holder 475. In some embodiments, the suction device 474 may be able to move forward and backward for a limited range with the help of a mechanical track 476.

In some embodiments, the item 478 picked up by the suction device 474 may then be moved to the transportation component (e.g., a channel or a conveyor belt attached to the end of the shelving unit) and dropped off thereof. The transportation component may move the item 478 to a backend item receiver for further processing (e.g., being collected and reorganized by employees). In some embodiments, each column 473 on the shelving unit 470 may host multiple items. When the first item 478 of a column is removed, the remaining items may be pushed or moved forward using conveying devices such as 479. The conveying devices may include a conveying belt under each of the columns or on one or both sides of each of the columns, a rotor that turns and advances the remaining items, another suitable device, or any combination thereof.

Figure 5:
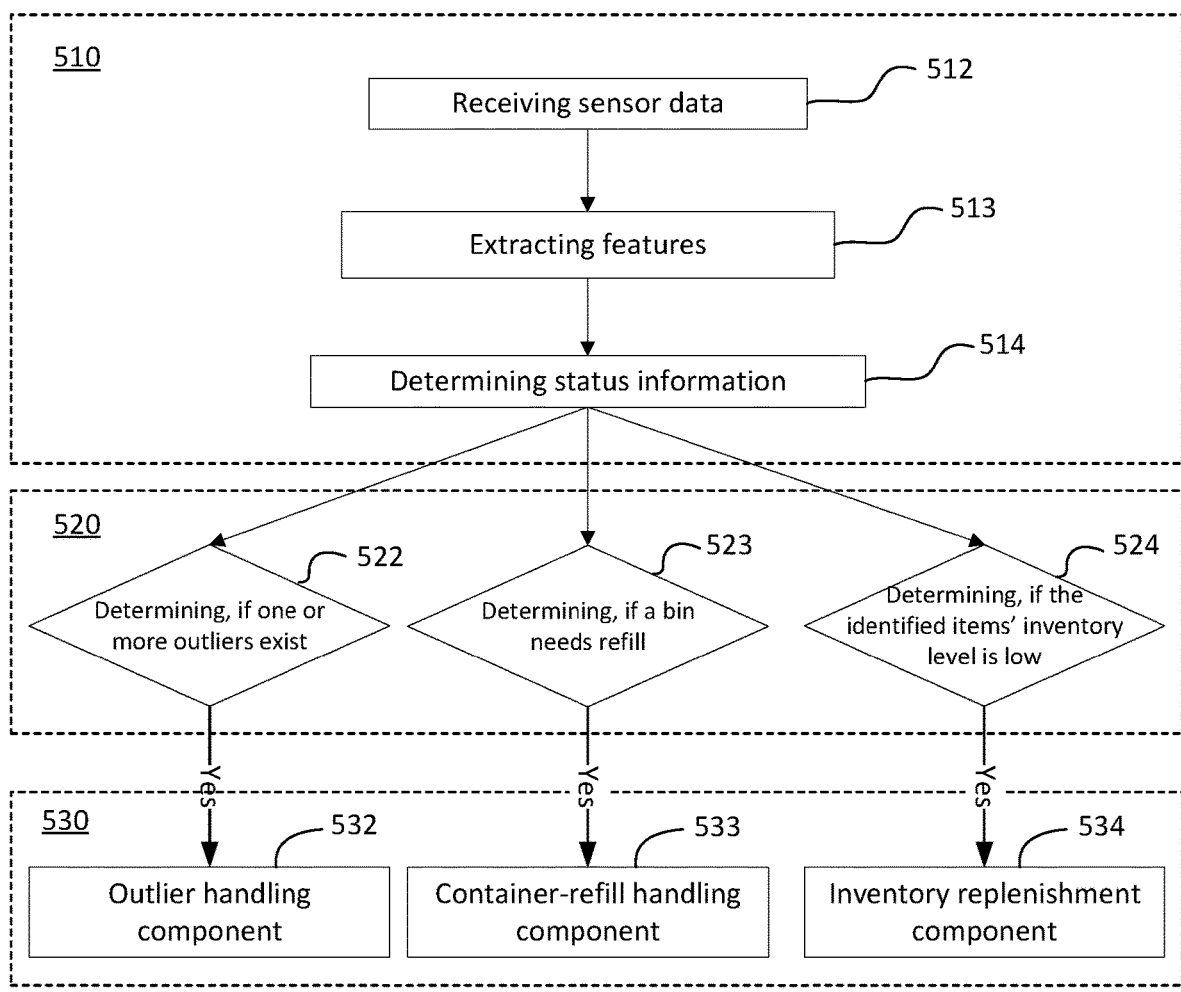
FIG. 5 illustrates an example process for determining tasks for automatically managing product items in a store.

FIG. 5 illustrates an example process for determining tasks for automatically managing product items in a store. As shown, the process 500 may comprise a plurality of phases, including a data processing phase 510, a determination phase 520, and an execution phase 530. In some embodiments, one or more phases of the system 500 may be skipped, split or merged to accommodate specific use cases.

In some embodiments, the system 500 may start with collecting and analyzing the data collected from various sensing sources in phase 510. For example, the system 500 may receive sensor data collected by the sensors installed on the fixtures in the store at step 512. The sensors may comprise one or more image sensors (e.g., RGB cameras, IR cameras, depth cameras), one or more weight sensors, one or more force sensors, one or more pressure sensors, one or more vibration sensors, one or more proximity sensors, one or more resistance-based film sensors, one or more capacitive sensors, other suitable sensors, or any combination thereof.

In some embodiments, the system 500 may extract features from the received sensor data at step 513. The features may comprise appearance features, location information, weight information, other suitable information, or any combination thereof. In some embodiments, the computer system may determine a product item is misplaced when the appearance features associated with the product item are contrasting with the adjoining product items. In some embodiments, the extracted features may be input into a trained machine learning model for object identification to determine the identities of the product items. In some embodiments, the identity of one product item may be used to determine misplacement. For example, the store may mark specific patterns on shelves or containers indicating the types of product items designed to be displayed therein. Therefore, the product item may be misplaced on a shelf or in a container if its determined identity is not among the identities recognized by the shelf or container.

In some embodiments, the computer system may determine the status information of the product items based on the extracted features at step 514. For example, based on the identities of the product items, the computer system may detect one or more of the product items on the shelve are in short supply and require restocking. As another example, it is common for a store to keep its up-to-date inventory logistics in a database during its inventory management. Based on the identities of the product items, the computer system may determine if the inventory level of a type of product item is insufficient to meet current or near-future demands and may require making orders from suppliers.

In some embodiments, the features extracted from the received sensor data may include location information. For example, the computer system may model the store space as a 3D grid, with each grid cell containing a group of product items (e.g., a container housing the group of product items). Therefore, the location of the group of product items may be represented as a 3D vector such as [aisle, section, container]. In some embodiment, the group of product items (e.g., in a container) may further be represented as a 2D grid, with each grid cell containing an individual product item. Therefore, the location of an individual product item in such an environment may be represented as a multi-dimensional vector such as [aisle, section, [row, column]].

In some embodiments, after the sensor data are collected and analyzed, the system 500 may determine if any issue needs to be handled in phase 520. As shown in FIG. 5, the process 500 may determine if one or more product items are outliers in the store at step 522, if the quantity of a product item on display is low at step 523, and if the inventory level of a product item is insufficient at step 524. In some embodiments, the system 500 may conduct as many determinations as necessary in phase 520. For example, the system 500 may also detect spilled liquid or dropped objects on the floor, moldy fruits, expired product items, another store-management related issue, or any combination thereof.

In some embodiments, after determining an issue in phase 520, the system 500 may proceed to solve the issue in phase 530. In some embodiments, each issue determined by the computer system may correspond to an execution component. For example, the outlier handling component 532 may handle a misplaced product item (or an item that needs to be rearranged) detected at step 522; the container-refill handling component 533 may refill a container identified at step 523; and the inventory replenishment component 534 may order from external suppliers the product items identified at step 524. In some embodiments, the execution components may correspond to a plurality of routines, with each routine comprising a list of instructions to solve the corresponding issue. Each of the instructions may comprise an action and a list of parameters defining the action. For example, an instruction to perform "moving" action may require at least one parameter "target location." In some embodiments, a routine may be executed by a mechanical device, a computer system, or the combination of thereof. When a routine is being executed by a mechanical device, the included instructions may comprise motions that the mechanical device is capable of performing.

Figure 6:
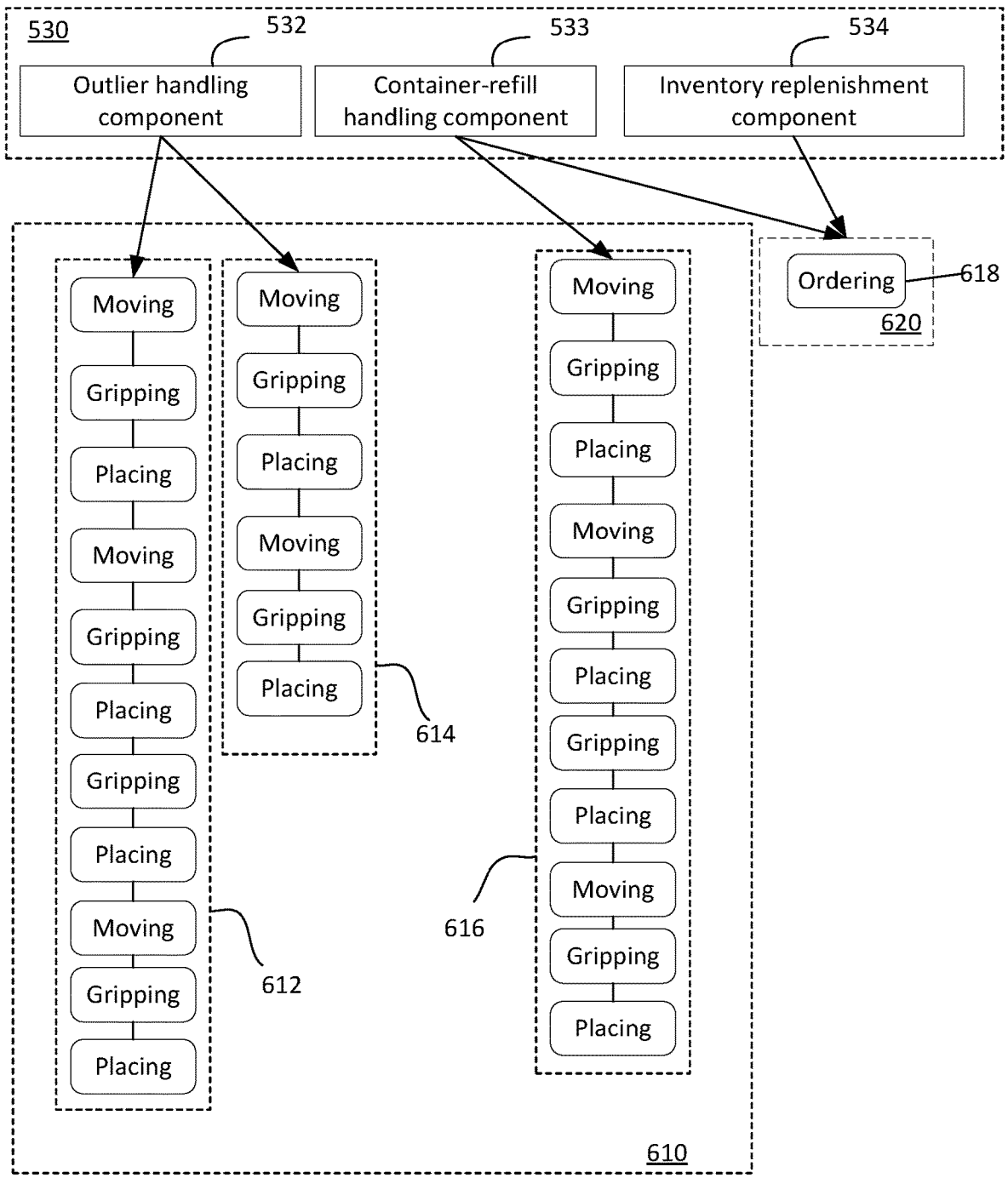
FIG. 6 illustrates an example system of executing tasks for automatically managing product items in a store.

FIG. 6 illustrates an example system of executing tasks for automatically managing product items in a store. As shown, each task to be executed may correspond to one or more routines such as 612, 614, 616 and 618. In some embodiments, some routines may be executed by a mechanical device coupled with the computer system, such as the routines in the group 610, and some may be performed by the computer device, such as the routines in the group 620. In some embodiments, one routine may be used to execute multiple tasks. For example, a routine of checking for inventory shortages may be performed during a scheduled inventory sweep (e.g., corresponding to the inventory replenishment component 534), as well as after refiling a container on a shelf (e.g., corresponding to the container-refiling component 533).

In some embodiments, a routine for solving a specific issue may vary depending on the store's arrangement. For example, if a store places the product items into containers for display on the shelves, a routine for removing an item may be accomplished either by removing the individual item directly, or by replacing the container holding the item with another prepared container. The choice may be made by evaluating the tradeoffs including the complexity of the routine and the capability requirement of the mechanical device. For example, the routine for directly removing the misplace product item may be simpler than the routine for replacing the container with another container. However, in order to directly remove individual product items, the mechanical device may require more sophisticated parts (e.g., hand) in order to properly handle individual items of different shapes, weights, textures. The increased complexity may increase the cost significantly. In contrast, handling containers may be simpler because of the relatively uniform shape of the containers.

In some embodiments, a routine may include a plurality of instructions, with each instruction comprising an action to be performed and a group of parameters defining the action. For example, the routine for removing an outlier (e.g., a misplace, rotten, or expired product item) from a container on a shelf may be represented as 612 in FIG. 6. Specifically, the routine may comprise the following instructions:

| Action | Parameters | Explanation |
| --- | --- | --- |
| Moving | Target location: a storage room | Moving the mechanical device to a storage room with prepared containers. |
| Gripping | Target object: a prepared container | Gripping the prepared container holding the designed product items. |
| Placing | Target location: a tray associated with the mechanical device | Placing the prepared container on a tray associated with the mechanical device. |
| Moving | Target location: the location of the outlier | Moving the mechanical device to the location of the outlier. |
| Gripping | Target object: the container holding the outlier | Gripping the container holding the outlier. |
| Placing | Target location: the tray associated with the mechanical device | Placing the container holding the outlier on the tray associated with the mechanical device. |
| Gripping | Target object: the prepared container on the tray. | Gripping the prepared container from the tray associated with the mechanical device. |
| Placing | Target location: the original location of the container holding the outlier | Placing the prepared container to the original location of the container holding the outlier. |
| Moving | Target location: a product item reorganization room | Moving the mechanical device to a product item reorganization room with the container holding the outlier, the product item reorganization room may share the storage room. |
| Gripping | Target object: the container holding the outlier | Gripping the container holding the outlier. |
| Placing | Target location: a designated area | Placing the container holding the outlier to a designated area waiting for being reorganized. |

In some embodiments, if the mechanical device is capable of gripping individual product item, the routine 614 for removing an outlier from a shelf may comprise the following instructions:

| Action | Parameters | Explanation |
| --- | --- | --- |
| Moving | Target location: the location of the outlier | Moving the mechanical device to the location of the outlier. |
| Gripping | Target object: the outlier | Gripping the outlier. |
| Placing | Target location: a tray associated with the mechanical device | Placing the outlier on a tray associated with the mechanical device. |
| Moving | Target location: the product item reorganization room | Moving the mechanical device to the product item reorganization room. |
| Gripping | Target object: the outlier | Gripping the outlier from the tray associated with the mechanical device. |
| Placing | Target location: the designated area | Placing the outlier to the designated ware waiting for being reorganized. |

In some embodiments, a sequence of actions may be shared by multiple routines to solve corresponding problems. For example, in a store using containers as the basic unit of handling product items, removing an outlier (e.g., a misplace, rotten, or expired product item) and refiling a container may share the same sequence of actions. However, the parameters for some of the actions may be different. For example, the routine 616 for refiling a container may comprise the following instructions:

| Action | Parameters | Explanation |
| --- | --- | --- |
| Moving | Target location: a storage room | Moving the mechanical device to a storage room with prepared containers. |
| Gripping | Target object: a prepared container | Gripping the prepared container holding the designed product items. |
| Placing | Target location: a tray associated with the mechanical device | Placing the prepared container on a tray associated with the mechanical device. |
| Moving | Target location: the location of the container to be refilled | Moving the mechanical device to the location of the container to be refilled. |
| Gripping | Target object: the container to be refilled | Gripping the container to be refilled. |
| Placing | Target location: the tray associated with the mechanical device | Placing the container to be refilled on the tray associated with the mechanical device. |
| Gripping | Target object: the prepared container on the tray. | Gripping the prepared container from the tray associated with the mechanical device. |

| Action | Parameters | Explanation |
| --- | --- | --- |
| Placing | Target location: the original location of the container to be refilled | Placing the prepared container to the original location of the container to be refilled. |
| Moving | Target location: the product item reorganization room | Moving the mechanical device to the product item reorganization room with the container holding the outlier, the product item reorganization room may share the storage room. |
| Gripping | Target object: the container to be refilled | Gripping the container to be refilled. |
| Placing | Target location: a designated area | Placing the container holding the outlier to a designated area waiting for being reorganized. |

In some embodiments, a task may require more than one routines to be executed. For example, after refiling a container with a specific type of product items, the computer system may typically check and update the inventory level corresponding to the product items. If the computer system determines that the current inventory level is insufficient to meet current or near-term demands, it may trigger another routine 618 to order more of the product items from suppliers. In some embodiments, the determination of sufficiency of the inventory level may based on a predetermined threshold. In some embodiments, the determination may also consider various factors such as the demand curve shifts (e.g., by observing the recent inventory change history), new trends (e.g., a trending product just beginning its lifecycle, like a newly released smart phone), profit margins, timing (e.g., holiday shopping season), diversity, another suitable factor, or any combination thereof.

In some embodiments, one routine may be shared by multiple tasks. For example, the routine 618 to make orders of certain product items from suppliers may be shared by both a container-refiling task and an inventory replenishment task. In some embodiments, besides checking and updating inventory logistics after restocking (e.g., refiling) product items on the shelves, the store may also perform periodical inventory sweeps that may trigger the routine 618 to be executed.

In some embodiments, certain actions in a routine may require a cooperation between the computer system and the mechanical device. For example, a "moving" action may comprise multiple steps such as determining route, controlling actuators and wheels, adjusting the route based on changing environment. In some embodiments, the mechanical device may be smart enough to manage all the steps to accomplish the "moving" action. In this case, the computer system may simply send the target location (e.g., a location of an outlying product item, a location of a container to be refilled) and the mechanical device may manage the rest of the task. In some embodiments, a less sophisticated mechanical device may be guided by the computer system towards the target location. The computer system may take advantage of the existing sensing system installed in the store and determine moves for the mechanical device based on the real-time sensor data. In some embodiments, a mechanical device may be equipped with sensors such as image sensors, liquid detection sensors, other suitable sensors, or any combination thereof. The sensors on the mechanical device may be able to observe the environment in close proximity with higher accuracy compared to the sensor installed on the ceiling and shelves. The observed data may be used by the mechanical device to adjust its moves (e.g., avoiding slippery area or small obstacles). In some cases, the direct lines of sight of the sensors installed on the fixtures in the store may be blocked by temporary obstacles (e.g., moving customers, shopping carts, a pile of product items to be restocked). The computer system may control the mechanical device to collect the missing data from the unreachable area.

In some embodiments, the mechanical device may comprise a main body associated with one or more detachable units. The units may be detached from the main body of the mechanical device to execute tasks and signal the main body upon the completions of the tasks. The main body of the mechanical device may then pick up the detachable units. In this way, the detachable units may empower the mechanical device to handle multiple tasks in parallel. In some embodiments, the mechanical device may maintain a task queue for the pending tasks. Once a detachable unit becomes available, the task from the top of the task queue may be assigned and executed. In some embodiments, the mechanical device may keep multiple task queues based on priorities of the tasks and schedule the executions according to the priorities. In some embodiments, each of the detachable units may conduct its programed operations independent of the main body of the mechanical device. In some embodiments, the detachable units may communicate with the main body of the mechanical device or the computer system reporting processing errors and requesting further instructions.

Figure 7:
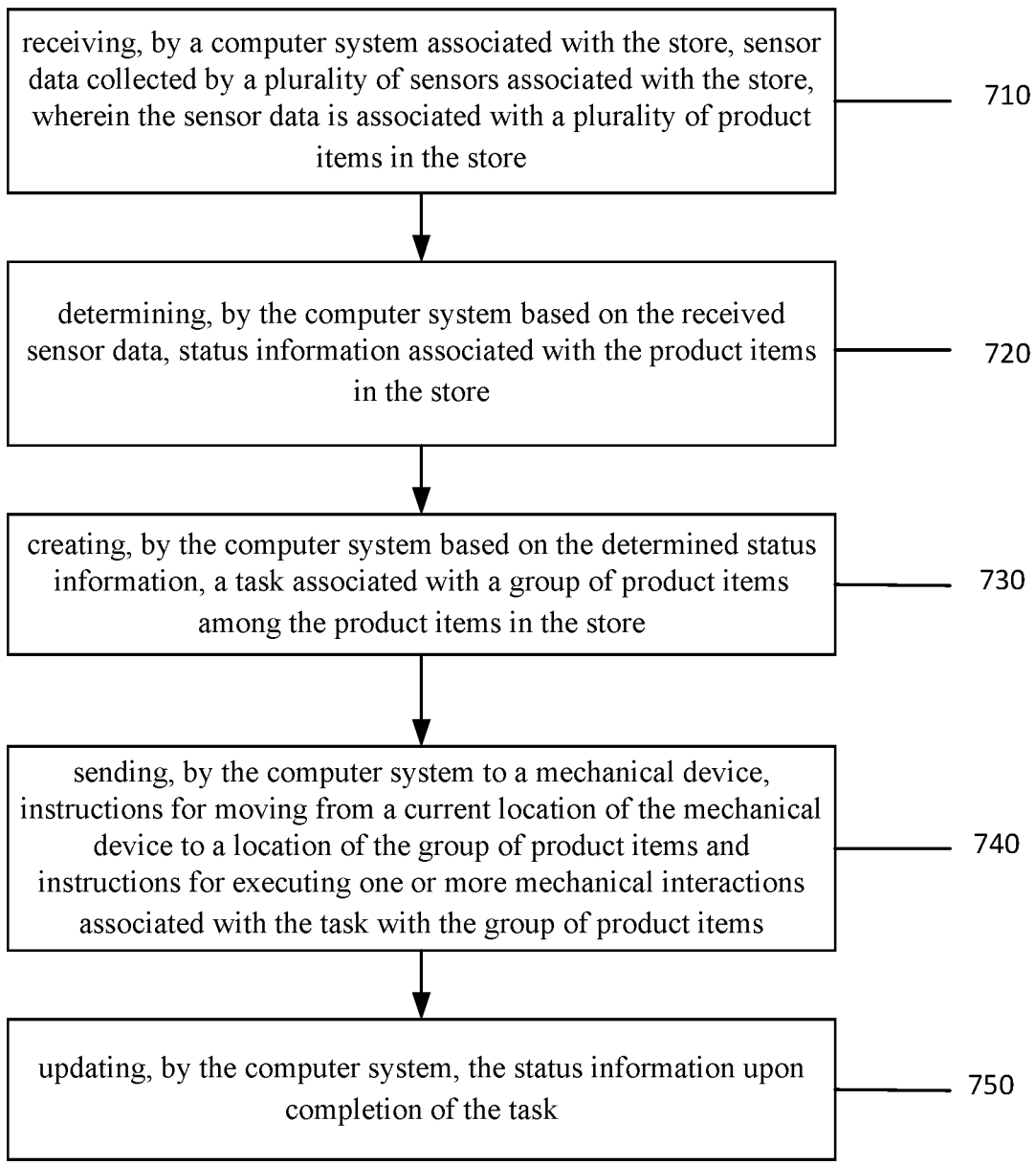
FIG. 7 illustrates a method of automatically managing product items in a store.

FIG. 7. illustrates a method of automatically managing product items in a store. The method 700 may be implemented in an environment shown in FIGS. 1 and 2. The method 700 may be performed by a device, apparatus, or system shown in FIG. 3. The method 700 may be performed by a mechanical device shown in FIGS. 4A-4C. Depending on the implementation, the method 700 may include additional, fewer, or alternative steps performed in various orders or in parallel.

Block 710 includes receiving, by a computer system associated with the store, sensor data collected by a plurality of sensors associated with the store, wherein the sensor data is associated with a plurality of product items in the store. In some embodiments, the plurality of product items may be placed in a plurality of containers; and the group of product items may comprise all product items in one of the containers. In some embodiments, the group of product items may share a same stock keeping unit (SKU).

Block 720 includes determining, by the computer system based on the received sensor data, status information associated with the product items in the store. In some embodiments, the status information associated with the product items may comprise: location information of the product items; and quantity information of the product items.

Block 730 includes creating, by the computer system based on the determined status information, a task associated with a group of product items among the product items in the store. In some embodiments, the task may comprise removing, from the location of the group of product items, one of the product items of the group that is different from that of one or more other product items of the group. In some embodiments, the task may comprise adding one or more product items to the group of product items.

Block 740 includes sending, by the computer system to a mechanical device, instructions for moving from a current location of the mechanical device to a location of the group of product items and instructions for executing one or more mechanical interactions associated with the task with the group of product items. In some embodiments, the sending instructions for moving from a current location of the mechanical device to a location of the group of product items may comprise: determining, for each of a plurality of points in time, a location of the mechanical device at the point in time; determining, based on the location of the mechanical device at the point in time and the location of the group of product items, one or more movements for the mechanical device; and sending, to the mechanical device, instructions for making the one or more movements. In some embodiments, the determining one or more movements for the mechanical device may comprise: detecting, by the computer system based on the sensor data collected by one or more of the plurality of sensors associated with the store, an obstacle on a path between the location of the mechanical device and the location of the group of product items; and determining the one or more movements to avoid the detected obstacle. In some embodiments, the mechanical interactions with the group of product items may comprise: removing an object from a location; or placing an object to a location. In some embodiments, the mechanical device may comprise one or more sensors, and the method 700 may further comprise: receiving data collected by the one or more sensors of the mechanical device; and adjusting, based on the data collected by the one or more sensors of the mechanical device, the instructions for moving from the current location of the mechanical device to the location of the group of product items or the instructions for executing the one or more mechanical interactions associated with the task. In some embodiments, the mechanical device may comprise: a first component configured to move the mechanical device from the current location of the mechanical device to the location of the group of product items; and a second component configured to execute the one or more mechanical interactions associated with the task, wherein the second component is detachable from the first component and is configured to send one or more signals to the first component Block 750 includes updating the status information upon completion of the task. In some embodiments, the updating the status information upon completion of the task may comprise: receiving, by the computer system from the mechanical device, a signal indicating the completion of the task; and updating, by the computer system, the quantity information of the one or more product items.

In some embodiments, the method 700 may further comprise ordering, based on the updated status information, a plurality of product items from a supplier.

Figure 8:
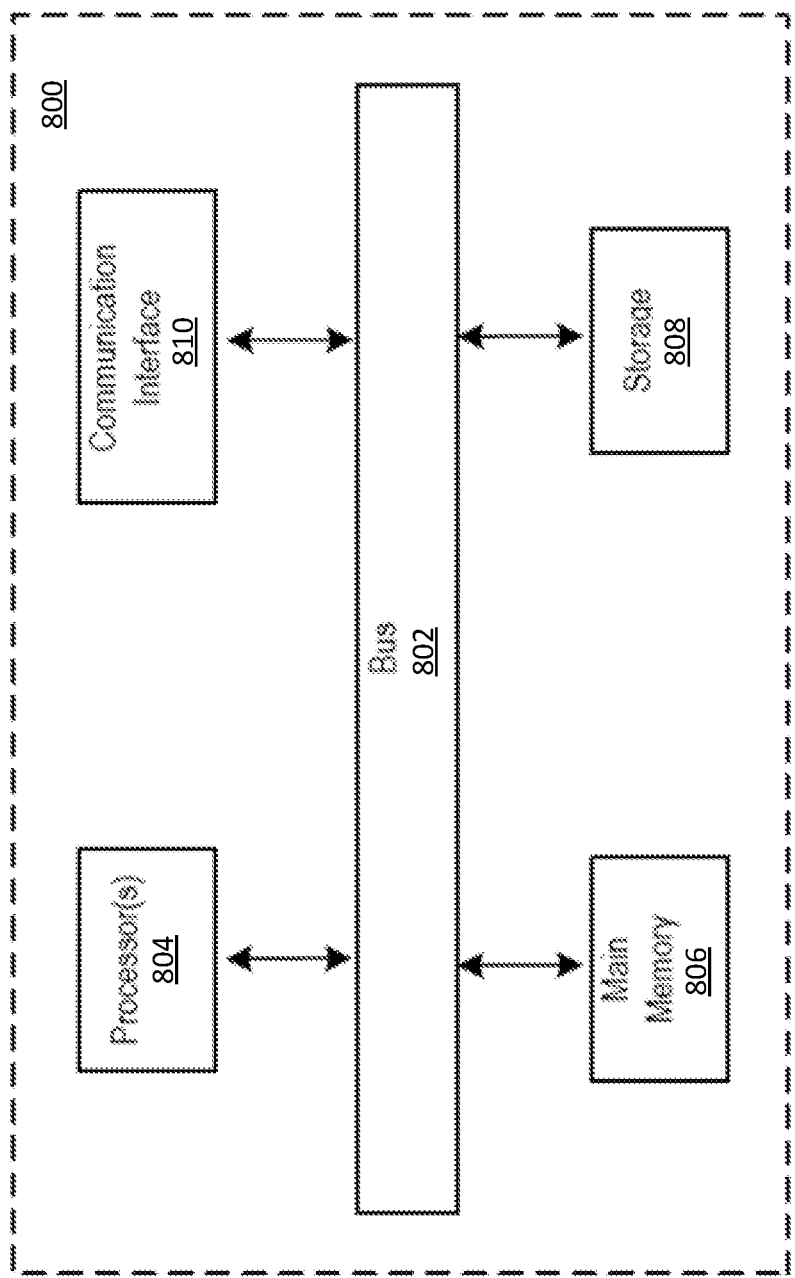
FIG. 8 illustrates an example electronic device for automatically managing product items in a store.

FIG. 8 illustrates an example electronic device for tracking persons in an autonomous store. The electronic device may be used to implement one or more layers shown in FIG. 3, one or more components shown in FIG. 4A, the process shown in FIG. 5, the system shown in FIG. 6, and the method shown in FIG. 7. The electronic device 800 may comprise a bus 802 or other communication mechanism for communicating information and one or more hardware processors 804 coupled with bus 802 for processing information. Hardware processor(s) 804 may be, for example, one or more general purpose microprocessors.

The electronic device 800 may also include a main memory 806, such as a random-access memory (RAM), cache and/or other dynamic storage devices, coupled to bus 802 for storing information and instructions to be executed by processor(s) 804. Main memory 806 also may be used for storing temporary variables or other intermediate information during execution of instructions to be executed by processor(s) 804. Such instructions, when stored in storage media accessible to processor(s) 804, may render electronic device 800 into a special-purpose machine that is customized to perform the operations specified in the instructions. Main memory 806 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The electronic device 800 may implement the techniques described herein using customized hard-wired logic, one or more ASICs or FPGAs, firmware and/or program logic which in combination with the electronic device may cause or program electronic device 800 to be a special-purpose machine. According to one embodiment, the techniques herein are performed by electronic device 800 in response to processor(s) 804 executing one or more sequences of one or more instructions contained in main memory 806. Such instructions may be read into main memory 806 from another storage medium, such as storage device 808. Execution of the sequences of instructions contained in main memory 806 may cause processor(s) 804 to perform the process steps described herein. For example, the processes/methods disclosed herein may be implemented by computer program instructions stored in main memory 806. When these instructions are executed by processor(s) 804, they may perform the steps as shown in corresponding figures and described above. In alternative embodiments, hard-wired circuitry may be used in place of or in combination with software instructions.

The electronic device 800 also includes a communication interface 810 coupled to bus 802. Communication interface 810 may provide a two-way data communication coupling to one or more network links that are connected to one or more networks. As another example, communication interface 810 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks, or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A method for managing product items in a store, comprising:

receiving, by a computer system associated with the store, store sensor data collected by a plurality of store sensors associated with the store, wherein the store sensor data is associated with a plurality of product items in the store;

determining, by the computer system, based on the received store sensor data, status information associated with the product items in the store;

creating, by the computer system, based on the determined status information, a task associated with a group of product items among the product items in the store based on one or more machine learning models;

sending, by the computer system, to a mechanical device, instructions for the mechanical device to move from a current location of the mechanical device to a location of the group of product items and instructions for the mechanical device to execute one or more mechanical interactions associated with the task with the group of product items, wherein the mechanical device comprises one or more device sensors;

receiving, by the computer system, device sensor data collected by the one or more device sensors of the mechanical device;

aggregating, by the computer system, the device sensor data with the store sensor data to obtain aggregated sensor data;

adjusting, by the computer system, based on the aggregated sensor data, the one or more machine learning models to obtain adjusted instructions for the mechanical device to move and execute the task;

updating, by the computer system, the status information upon completion of the task; and ordering, by the computer system, based on the updated status information, a plurality of product items from a supplier.

2. The method of claim 1, wherein the status information associated with the product items comprises:

location information of the product items; and
quantity information of the product items.

3. The method of claim 2, wherein the updating the status information upon completion of the task comprises:

receiving, by the computer system from the mechanical device, a signal indicating the completion of the task; and updating, by the computer system, the quantity information of the one or more product items.

4. The method of claim 1, wherein:

the plurality of product items are placed in a plurality of containers; and the group of product items comprises all product items in one of the containers.

5. The method of claim 1, wherein the group of product items share a same stock keeping unit (SKU).

6. The method of claim 1, wherein the task comprises removing, from the location of the group of product items, one or more product items of the group that are different from one or more other product items of the group.

7. The method of claim 1, wherein the task comprises adding one or more product items to the group of product items.

8. The method of claim 7, wherein the determining one or more movements for the mechanical device comprises:

detecting, by the computer system based on the sensor data collected by one or more of the plurality of sensors associated with the store, an obstacle on a path between the location of the mechanical device and the location of the group of product items; and determining the one or more movements to avoid the detected obstacle.

9. The method of claim 1, wherein the sending instructions for moving from a current location of the mechanical device to a location of the group of product items comprises:

determining, for each of a plurality of points in time, a location of the mechanical device at the point in time;
determining, based on the location of the mechanical device at the point in time and the location of the group of product items, one or more movements for the mechanical device; and
sending, to the mechanical device, instructions for making the one or more movements.

10. The method of claim 1, wherein the one or more mechanical interactions associated with the task comprise:
removing an object from a location; or
placing an object to a location.

11. The method of claim 1, wherein the mechanical device comprises:
a first component configured to move the mechanical device from the current location of the mechanical device to the location of the group of product items; and
a second component configured to execute the one or more mechanical interactions associated with the task, wherein the second component is detachable from the first component and is configured to send one or more signals to the first component.

12. A system for managing product items in a store comprising a plurality of sensors and a computer system, the computer system comprising a processor and a non-transitory computer-readable storage medium storing instructions executable by the processor to cause the system to perform operations comprising:
receiving store sensor data collected by a plurality of store sensors associated with the store, wherein the store sensor data is associated with a plurality of product items in the store;
determining based on the received store sensor data, status information associated with the product items in the store;
creating, based on the determined status information, a task associated with a group of product items among the product items in the store based on one or more machine learning models;
sending, to a mechanical device, instructions for the mechanical device to move from a current location of the mechanical device to a location of the group of product items and instructions for the mechanical device to execute one or more mechanical interactions associated with the task with the group of product items, wherein the mechanical device comprises one or more device sensors;
receiving device sensor data collected by the one or more device sensors of the mechanical device;
aggregating the device sensor data with the store sensor data to obtain aggregated sensor data;
adjusting, based on the aggregated sensor data, the one or more machine learning models to obtain adjusted instructions for the mechanical device to move and execute the task; and
updating the status information upon completion of the task.

13. The system of claim 12, wherein:
the plurality of product items are placed in a plurality of containers; and
the group of product items comprises all product items in one of the containers.

14. The system of claim 12, wherein the group of product items share a same stock keeping unit (SKU).

15. The system of claim 12, wherein the one or more mechanical interactions associated with the task comprise removing, from the location of the group of product items, one or more of the product items of the group that are different from one or more other product items of the group.

16. The system of claim 12, wherein the mechanical device comprises:
a first component configured to move the mechanical device from the current location of the mechanical device to the location of the group of product items; and
a second component configured to execute the one or more mechanical interactions associated with the task, wherein the second component is detachable from the first component and is configured to send one or more signals to the first component.

17. A non-transitory computer-readable storage medium for managing product items in a store, configured with instructions executable by one or more processors to cause the one or more processors to perform operations comprising:
receiving store sensor data collected by a plurality of store sensors associated with the store, wherein the store sensor data is associated with a plurality of product items in the store;
determining based on the received store sensor data, status information associated with the product items in the store;
creating, based on the determined status information, a task associated with a group of product items among the product items in the store based on one or more machine learning models;
sending, to a mechanical device, instructions for the mechanical device to move from a current location of the mechanical device to a location of the group of product items and instructions for the mechanical device to execute one or more mechanical interactions associated with the task with the group of product items, wherein the mechanical device comprises one or more device sensors;
receiving device sensor data collected by the one or more device sensors of the mechanical device;
aggregating the device sensor data with the store sensor data to obtain aggregated sensor data;
adjusting, based on the aggregated sensor data, the one or more machine learning models to obtain adjusted instructions for the mechanical device to move and execute the task; and
updating the status information upon completion of the task.

18. The non-transitory computer-readable storage medium of claim 17, wherein:
the plurality of product items are placed in a plurality of containers; and
the group of product items comprises all product items in one of the containers.

19. The non-transitory computer-readable storage medium of claim 17, wherein the task comprises removing, from the location of the group of product items, one or more product items of the group that are different from one or more other product items of the group.

20. The non-transitory computer-readable storage medium of claim 17, wherein the task comprises adding one or more product items to the group of product items.

* * * * *